P. COONROD.
DOUBLE CULTIVATOR.
72456
PATENTED
DEC 24 1867
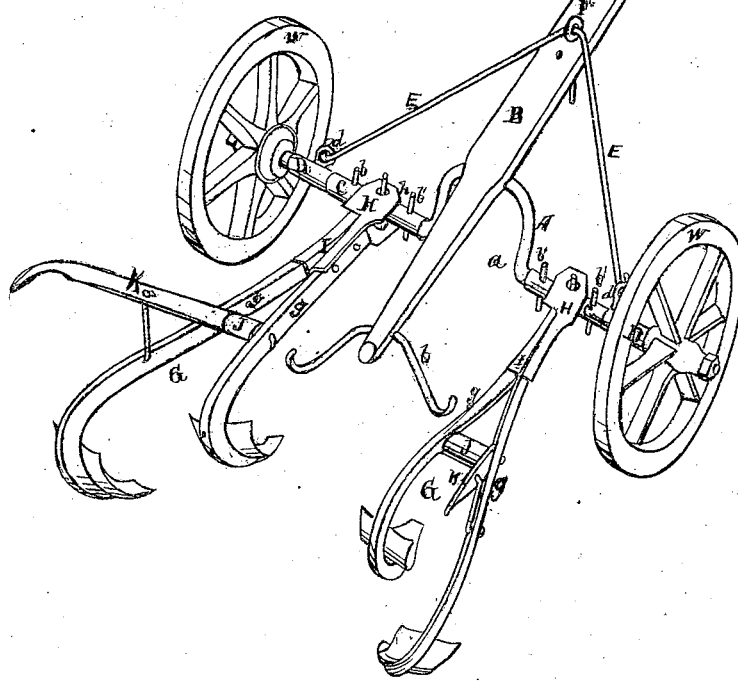
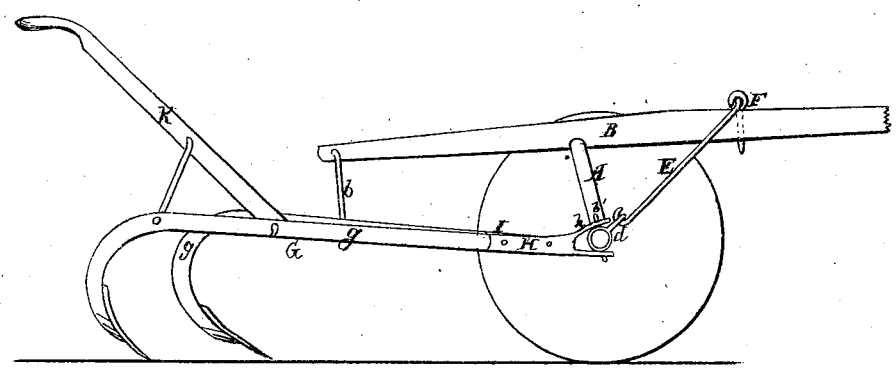
Witnesses:
D. Haunt
Jas R. Hayden
P. Coonrod,
Inventor.
by J. B. Turchin
his Attorney in fact

UNITED STATES PATENT OFFICE.

PHILIP COONROD, OF KEITHSBURG, ILLINOIS.

IMPROVEMENT IN DOUBLE CULTIVATOR-PLOW.

Specification forming part of Letters Patent No. 72,456, dated December 24, 1867.

*To all whom it may concern:*

Be it known that I, PHILIP COONROD, of Keithsburg, in the county of Mercer and State of Illinois, have invented new and useful Improvements in Double Cultivator or Plow; and I do hereby declare that the following is a full and exact description thereof, reference being had to the accompanying drawings, making part of this specification, in which—

Figure 1 represents a perspective view of the machine, and Fig. 2 a side elevation of one gang of plows.

The object of my invention is to provide a cheap and durable cultivator, well adapted for cultivation of corn, potatoes, cotton, or any other grain or vegetables planted in rows; and its nature consists in two separate and adjustable gangs of two plows each, attached to an axle-tree curved in the middle, and the whole so arranged as to be well adapted for the above-said cultivations.

To enable others skilled in the art to make and use my invention, I will proceed to describe its construction and operation.

A is an axle, curved upward in the middle, $a$, and of uniform diameter throughout, the spindles for the wheels not tapering; B, a tongue, bolted to the axle at the top of its bent part $a$, and carrying at its back end a bent rod, $b$, hooked at the ends to support the gangs of plows when not working; C C, iron boxes slipped over the axle, next to the shoulder of the curve $a$, partially revolving, and provided with several pins, $b'$ $b'$, on the top and bottom, for attaching the clevis of the plow-gangs and regulating the width between the gangs; D D, iron boxes, also slipped over the axle between the boxes C C and the hubs of the wheels W W, provided with ears $d$ $d$ near the inner end, into which the ends of the draft-rod E are hooked, which rod, after being hooked to one ear $d$, passes to the other ear over the tongue, at the point where double whiffletree is placed, both being secured to the tongue by a hook-headed bolt, F.

The gangs G G, on which the shovels or plows set, are each made of two iron bars, $g$ $g$, having a curved shape, said bars being secured to the axle-tree by means of a clevis, H, formed in a shape of jaw $h$ at one end, which jaw clasps the pins $b'$ $b'$ of the box C, and in a shape of a double flange, I, at the other, to receive the iron bars $g$ $g$ of the gangs, which are bolted to it.

Rollers J J unite the bars $g$ $g$ by being riveted to and between them.

K K are the handles to regulate the movement of the gangs.

The operation of the machine consists in this, that the width between the gangs is adjusted, according to the width between the rows of plants to be cultivated, by means of jaws $h$ $h$ and pins $b$ $b$, as described, and the operator, by means of handles K K, directs the gangs, the row of plants being taken between them.

What I claim as my invention, and desire to secure by Letters Patent, is—

The cultivator consisting of two separate gangs of plows, G G, each gang constructed of curved iron bars $g$ $g$, as described, and adjusted by means of clevis H and box C, both constructed and operating substantially as herein set forth, in combination with axle-tree A, constructed as described, boxes D D, and draft-rod E, substantially as set forth.

PHILIP COONROD.

Witnesses:
HARRISON SCOTT,
J. T. CALHOUN.